United States Patent Office 3,016,754
Patented Jan. 16, 1962

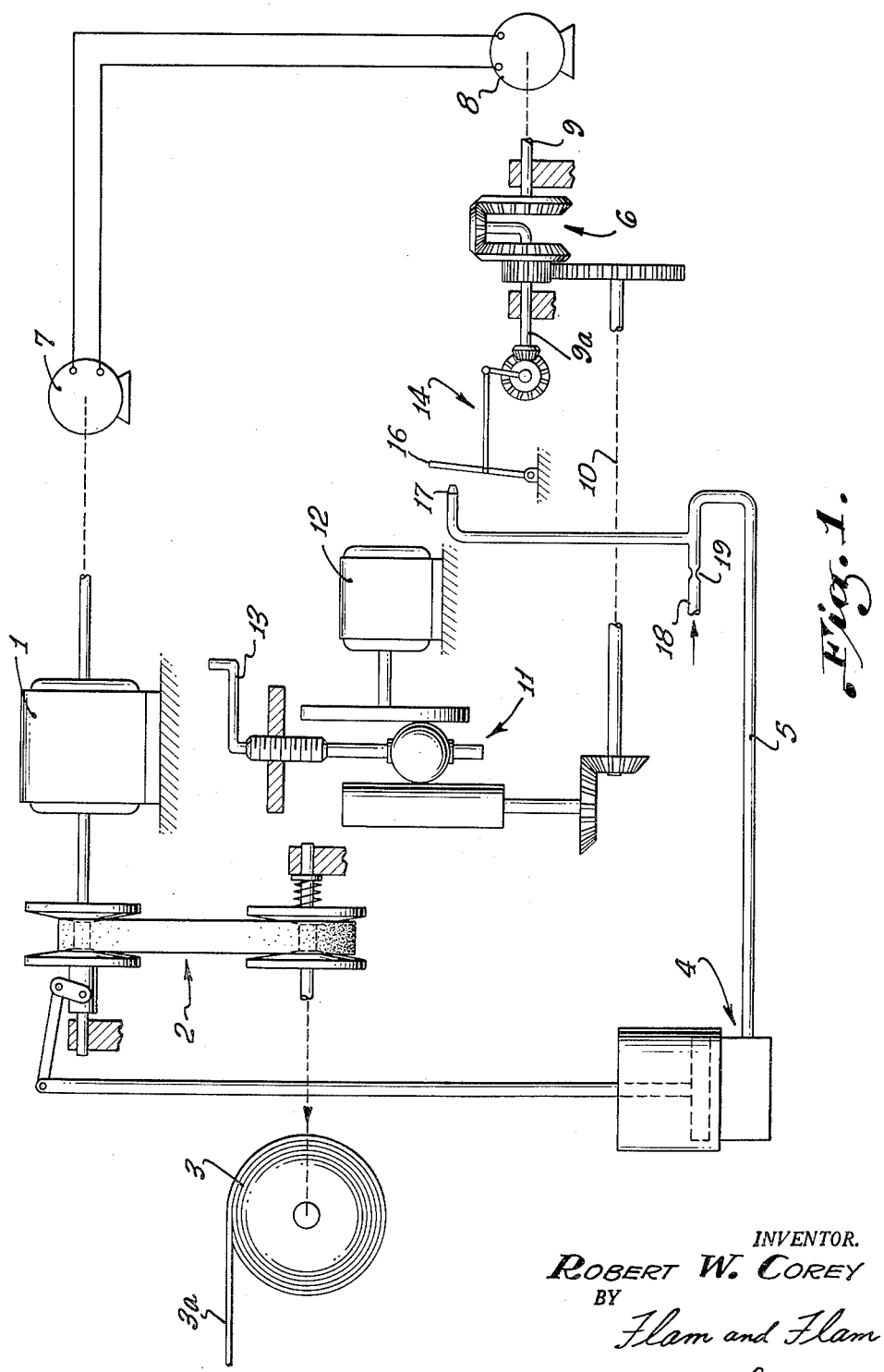

3,016,754
CONTROL SYSTEM FOR POWER TRANSMISSION
Robert W. Corey, Anaheim, Calif., assignor to U.S. Electrical Motors, Inc., Los Angeles, Calif., a corporation of California
Filed Nov. 3, 1958, Ser. No. 771,386
3 Claims. (Cl. 74—230.17)

This invention relates to electric motors, such as induction motors, which are adapted to operate a load of varying characteristics.

As an example, such a motor may be employed to operate a rewind roll for a web. Such a web (of fabric, paper, etc.) being wound on the roll, serves to increase its effective diameter. If the web is fed at a constant speed, it is obvious that the peripheral linear speed of the roll must also be kept at that constant value. If the speed at the windup roll is too great, the web is placed under greater and greater tensile stress, as it is being pulled faster than the feed allows.

In order to overcome this difficulty, it has been proposed to interpose a variable ratio transmission mechanism between the motor and the roll, so as to make it possible to reduce the angular speed of the roll by adjustment of the mechanism.

It is one of the objects of this invention to provide an improved control system of this character in which the variable ratio transmission mechanism is automatically adjusted in response to incipient changes in tension, and in a continuous manner.

Thus another object of the invention is to maintain the power output of a motor at a constant value, when driving a variable speed transmission mechanism, as the torque of the output load varies.

It is sometimes desirable to increase or otherwise adjust the tension very gradually as the rewinding progresses. It is another object of this invention to make it possible to provide such adjustment in a continuous manner, the ultimate tension at the end of the rewind period having a definite ratio to the starting tension.

This invention possesses many other advantages, and has other objects which may be made more clearly apparent from a consideration of an embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of the invention is best defined by the appended claims.

Referring to the drawings:

The single figure is a diagrammatic representation of a system incorporating the invention.

In FIG. 1 a multi-phase induction motor 1 is indicated as driving the input of a mechanical variable speed transmission 2 coupled to a load 3. The load 3 in this instance may be a rewind roll upon which a web 3a is wound up. The mechanical variable speed transmission with its associated induction motor may be of the type illustrated in Patent No. 2,398,235, issued April 9, 1946, in the name of Frederick O. Luenberger.

Preferably the induction motor is of the type which has a maximum slip of from eight to thirteen percent. Thus in this way, an ample margin is provided for the control of the system upon a change in motor speed.

In order that there be no excessive tension imposed upon the web 3a, the output of the transmission 2 must be reduced in angular speed so as to maintain the peripheral speed of the constantly enlarging roll constant. At the same time the torque required to drive the load 3 increases; and since the horsepower delivered by the induction motor 1 is proportional to the product of speed and torque, it is obvious that for proper control, the horsepower delivered by the induction motor must be kept substantially constant.

A continuous adjustment of the mechanical variable transmission 2, to reduce the angular speed of the windup roll 3, may be effected by a pneumatic servoactuator 4 of the type illustrated in FIG. 2 of Patent No. 2,653,578, issued September 29, 1953 to C. B. Moore. The arrangement is such that this servoactuator is affected by a pneumatic line 5 which operates the servoactuator 4. The manner in which this pneumatic line is supplied with air under pressure will now be described.

The load on the induction motor 1 tends to increase as the roll or load 3 increases in size. This produces a slowing down of the induction motor; i.e. its slip increases. As it slows down, it affects one of the input elements of a remote mechanical differential mechanism 6. This is accomplished by a synchronous transmitter 7, which may be a synchronous alternator driven by the shaft of the induction motor 1. The output of the synchronous transmitter 7 is received by a synchronous motor 8 supplying the input element 9 of the mechanical differential mechanism 6. Thus, one input of the mechanical differential has a speed corresponding to the speed of the induction motor 1.

The other input element 10 is driven by an auxiliary mechanical variable speed transmission 11. The input of this transmission 11 is driven by a synchronous motor 12, which has a constant speed. Manual adjustment of the ratio of the mechanical variable transmission is affected as indicated by the handle 13. The motor 12 operates a friction wheel acting on a rotary ball which in turn operates a cylinder coupled to shaft 10.

The manual adjustment of the ratio of mechanism 11 determines the horsepower which the induction motor is to deliver. The output element 9a of the differential mechanism 6 measures the difference between the inputs 9 and 10. This output affects a transducer 14, whereby signal air is supplied to the conduit 5 corresponding to the angular motion of the output element 9a. The pressure of the signal air controls power air for the servoactutor 4, which assumes a position corresponding to the signal air.

The output shaft 9a of the differential mechanism 6 operates a flapper to control a jet which forms a bypass for compressed air supplied at the left-hand end of a conduit 18. Thus, when the flapper is close to the jet, a greater amount of air can pass into the conduit 5. When the flapper is moved toward the right so as to leave the jet relatively unrestricted, more air passes through the jet and there is a reduction in the effective pressure of the air passing to the servoactuator 4. Thus when the flapper is close to the jet, the air velocity through a restriction 19 in conduit 18 is low and therefore a low pressure drop occurs at 19, and the pressure in conduit 5 approaches that in conduit 18. When the flapper is moved toward the right so as to leave the jet relatively unrestricted, the air velocity through restriction 19 is high and therefore a high pressure drop occurs at 19 and the pressure in conduit 5 is lowered with respect to that in conduit 18. There is no flow of air through conduit 5, and the pressure in conduit 5 is used to signal servoactuator 4. Of course, the motion of shaft 9a is quite slow and gradual, and corresponds to the rate at which it is necessary to reduce the speed of the output of the mechanism 2. Thus there is usually only a very small difference in the speeds of the input elements 9 and 10. The position of flapper 16 is thus adjusted continuously so as to provide the proper air pressure to the servoactuator 4.

As the roll being rewound is increased in size, the mechanical variable speed transmission 2 thus automatically provides a decreased ratio of transmission so as to slow down the shaft driving the roll in a gradual and continuous manner. For this purpose, the pressure in conduit 5 is gradually varied, as above explained, in a manner corresponding to the condition set by the mechanical variable speed transmission 11 so as to continue to effect this adjustment.

In order to provide a sufficient control function as stated hereinabove, the induction motor 1 is preferably one that has a relatively large slip, so that its speed decreases appreciably upon even a slight increase in load.

Thus, the signal air pressure in conduit 5 is gradually varied in order continuously to adjust the mechanical variable speed transmission device 2 and thereby to maintain constant speed and tension on the web for all rewind roll diameters.

The inventor claims:

1. In a system for controlling the tension on a web being wound: a first variable ratio transmission mechanism; a second variable ratio transmission mechanism; electrically energizable motor means for driving the first mechanism; means for driving the second transmission mechanism at constant speed; means for independently adjusting the ratio of the second mechanism; means for comparing a function of the angular movements of the output of the motor means and the output of the other mechanism; and means controlling the ratio of the first mechanism in accordance with said comparison.

2. In a system for controlling the tension on a web being wound: a first variable ratio transmission mechanism; a second variable ratio transmission mechanism; electrically energizable motor means for driving the first mechanism; means for driving the second transmission mechanism at constant speed; means for independently adjusting the ratio of the second mechanism; a mechanical differential device for subtraction of angular motion; said device having two input drives respectively actuated in accordance with the angular movements of the output of the motor means and the output of the other mechanism; and a transducer employing the output of the mechanical differential for causing adjustment of the ratio of the first mechanism.

3. The combination as set forth in claim 2, in which the transducer is a pneumatically operated device, and includes means operated by the output of the differential for affecting the air pressure on the output side of the transducer.

References Cited in the file of this patent

UNITED STATES PATENTS

| | | |
|---|---|---|
| 1,577,618 | Ford | Mar. 23, 1926 |
| 2,206,875 | Chaffee et al. | July 9, 1940 |
| 2,263,371 | Tolnai | Nov. 18, 1941 |
| 2,388,680 | Dawson | Nov. 13, 1945 |
| 2,398,235 | Luenberger | Apr. 9, 1946 |
| 2,442,389 | Weiss | June 1, 1948 |
| 2,512,008 | Bickel | June 20, 1950 |
| 2,540,989 | Newell | Feb. 6, 1951 |
| 2,653,578 | Moore | Sept. 29, 1953 |
| 2,739,447 | Newell | Mar. 27, 1956 |